United States Patent

Hayashi et al.

Patent Number: 6,061,628
Date of Patent: May 9, 2000

[54] NAVIGATION SYSTEM FOR VEHICLES

[75] Inventors: Seiji Hayashi; Kihachi Hayashida; Keizo Inoue; Mitsuhiro Nimura; Shinichi Kato; Katsuhiko Mutsuga, all of Anjo, Japan

[73] Assignee: Aisin AW Co., Ltd., Japan

[21] Appl. No.: 08/837,148

[22] Filed: Apr. 14, 1997

[30] Foreign Application Priority Data

Apr. 24, 1996 [JP] Japan .................................. 8-102685
Jul. 16, 1996 [JP] Japan .................................. 8-185854

[51] Int. Cl.⁷ .......................... G01C 21/22; G08G 1/968
[52] U.S. Cl. ........................ 701/208; 701/201; 701/210; 340/990
[58] Field of Search ..................................... 701/201, 202, 701/205, 207, 208, 209, 210, 211; 340/990, 995; 342/457, 357

[56] References Cited

U.S. PATENT DOCUMENTS

| | | | |
|---|---|---|---|
| 4,882,696 | 11/1989 | Nimura et al. | 701/211 |
| 5,067,082 | 11/1991 | Nimura et al. | 701/208 |
| 5,130,709 | 7/1992 | Toyama et al. | 340/995 |
| 5,206,811 | 4/1993 | Itoh et al. | 364/449 |
| 5,351,059 | 9/1994 | Tsuyuki | 342/457 |
| 5,371,497 | 12/1994 | Nimura et al. | 340/995 |
| 5,430,655 | 7/1995 | Adachi | 364/449 |
| 5,790,403 | 8/1998 | Nakayama | 701/28 |
| 5,839,086 | 11/1998 | Hirano | 701/207 |

FOREIGN PATENT DOCUMENTS

| | | |
|---|---|---|
| 0375817 | 7/1990 | European Pat. Off. . |
| 0489915 | 6/1992 | European Pat. Off. . |
| 19531822 | 4/1996 | Germany . |
| 9601463 | 1/1996 | WIPO . |

*Primary Examiner*—Tan Nguyen
*Attorney, Agent, or Firm*—Lorusso & Loud

[57] ABSTRACT

Lane change guidance information is output based on data for the next guide intersection on a route calculated in advance and on detection of the driving lane in which the vehicle is currently driven. The system includes present position detection, direction of advance determination for guide intersections along the preset route, driving lane determination, and guidance information output for instructing the driver when direction to be taken at a guide intersection does not match the current driving lane, whereby adequate guidance information is provided the driver regarding lane changes when the vehicle is driven on a road having two or more lanes.

4 Claims, 15 Drawing Sheets

Searched (suggested) road data

| Block number (n) | | | |
|---|---|---|---|
| 1 | Road number (m) | | (Example) |
| | ① | Starting point | I |
| | | End point | II |
| | | Roads having the same starting point | ... |
| | | Roads having the same end point | ②③④⑤⑥ |
| | | Length | 50m |
| | | Road attribute | Prefectural road |
| | | Width | 6 m |
| | | Road requiring no guidance | ③ |
| | | Prohibition information | ⑤ |
| | | Address and size of node data | ... |
| | ⋮ | ⋮ | ⋮ |
| | ⓜ | | |
| ⋮ | ⋮ | | |
| n | | | |

Road number

Intersection number

Intersection data

| | Number of intersections (k) |
|---|---|
| 1 | Intersection number |
| | Intersection name |
| | Traffic signal data |
| | Pedestrians' crossing data |
| | Branched point distinctive object data |
| | Entry road data |
| | Advancing road data |
| | Landmark data |
| | ⋮ |
| k | |

FIG. 5

Guidance phrase data

| Type of phrase | Detail of phrase |
|---|---|
| A Distance phrase | 1 About 700 meters<br>2 About 300 meters<br>3 Very soon<br>4 Ahead<br>⋮ |
| B Direction phrase | 1 Straight ahead<br>2 Turn to right<br>3 Turn to left<br>4 Change the lane rightward<br>5 Change the lane leftward<br>⋮ |
| C Distinctive object phrase | 1 Intersection without traffic signal<br>2 At next traffic signal<br>3 Second traffic signal<br>4 Intersection before traffic signal<br>5 Next filling station<br>⋮ |

VICS transmission data

| Link number (k) | |
|---|---|
| 1 | Degree of congestion |
|   | Foremost position of congested section |
|   | Length of congested section |
|   | Traffic restriction information |
|   | Traveling time |
|   | Lane information |
| ⋮ | ⋮ |
| k | |

Correspondence table of VICS transmission data to road data in information storage unit

| VICS link number (k) | |
|---|---|
| 1 | CD link number 3 |
|   | CD link number 4 |
|   | CD link number 5 |
| ⋮ | ⋮ |
| k | |

FIG. 13 (a)
Guidance road data

| Number of roads (n) | | |
|---|---|---|
| 1 | Road number | |
| | Length | |
| | Road attribute data | |
| | Address and size of shape data | |
| | Address and size of guidance data | |
| | ⋮ | |
| n | | |

FIG. 13 (b)
Shape data

| Number of nodes (m) | |
|---|---|
| 1 | Eastern longitude |
| | Northern latitude |
| | Address |
| ⋮ | ⋮ |
| m | |

FIG. 13 (c)
Guidance data

| Intersection data |
|---|
| Precaution data |
| Road name data |
| Address and size of road name voice data |
| Address and size of destination data |

FIG. 13 (d)
Road attribute data

| | | |
|---|---|---|
| Overpass/ underpass data | Overpass | |
| | Road alongside overpass | |
| | Underpass | |
| | Road alongside underpass | |
| Number of lanes | 3 lanes or more | |
| | 2 lanes | |
| | One lane | |
| | No centerline | |
| Opened/ unopened road data | Opening status | 0 or 1 |
| | Date and time of scheduled opening | a b c |

NAVIGATION SYSTEM FOR VEHICLES

BACKGROUND OF THE INVENTION

The present invention relates to a navigation system for a vehicle which provides route guidance to an input destination, along a preset route.

A vehicular navigation system is a system by which a route to a destination from the present position of the vehicle or from a specified departure point is searched based on input data such as destination data, and route guidance is provided based on an optimal route determined by the search, thereby providing the driver with information regarding the determined ("optimal") route to the destination, as the vehicle is driven along that route, a route with which the driver may not be very familiar. In the conventional type vehicular navigation system, data for the estimated present position of the vehicle on a road is obtained from the stored map data by map match processing based on parameters detected by various sensors in a present position detecting unit. Based on the present position obtained by this processing, information pertaining to the next intersection or the next branch point is output, e.g. by an arrow on a display or the like, at a point a given distance in advance of the intersection where the vehicle should be turned to the right or left or after passing through an intersection.

However, in the conventional type navigation system as described above, when the vehicle is driven on a road which has two or more lanes and the vehicle is to be turned right or left at an intersection, the driver often does not know if the vehicle is currently in a right turn lane, a straight ahead lane or a left turn lane. The driver often becomes aware that the vehicle is in a straight ahead lane only immediately before the intersection and may hurriedly try to change lanes into a right turn lane or into a left turn lane or find that he or she cannot change lanes.

SUMMARY OF THE INVENTION

To solve the above problems, it is an object of the present invention to provide a navigation system for vehicles, which can provide adequate guidance information regarding the lane in which the vehicle is currently driven, on a road having two or more lanes. To attain this objective, the navigation system of the present invention is characterized in that it provides for output of the next item of guidance information on the preset route, inclusive of information regarding lane change, in accordance with the lane in which the vehicle is currently driven.

The navigation system of the present invention provides route guidance along a preset route to an input destination. Accordingly, the present invention may include present position detecting means for detecting the present position of the vehicle, advance direction acquiring means for acquiring information as to the direction of advance at a guide intersection, driving lane acquiring means for determining the lane in which the vehicle is currently driven, and guidance information output means for outputting guidance information in the case where the direction to be taken at the guidance intersection does not match the driving lane.

The navigation system of the present invention may further include driving lane comparing means for comparing guidance information received at the guidance intersection with guidance information based on the current driving situation.

According to the present invention, it is possible to provide adequate guidance as to the proper driving lane when the vehicle is driven along a road having two or more lanes. For example, in the case where the vehicle should be turned left at the next guide intersection, guidance for a left turn should be given if the vehicle is currently driven in a left turn lane. On the contrary, if it is found that the current driving lane is not the left turn lane, the driver is first directed to change into the left turn lane, and then instruction for a left turn is given. As a result, the driver can drive the vehicle at ease without missing the time for the left turn.

BRIEF DESCRIPTION OF THE DRAWINGS

FIG. 5 represents a guidance phrase data file as used in the present invention;

FIG. 13 shows an arrangement of road attribute data files;

DESCRIPTION OF THE PREFERRED EMBODIMENTS

Figure 1:
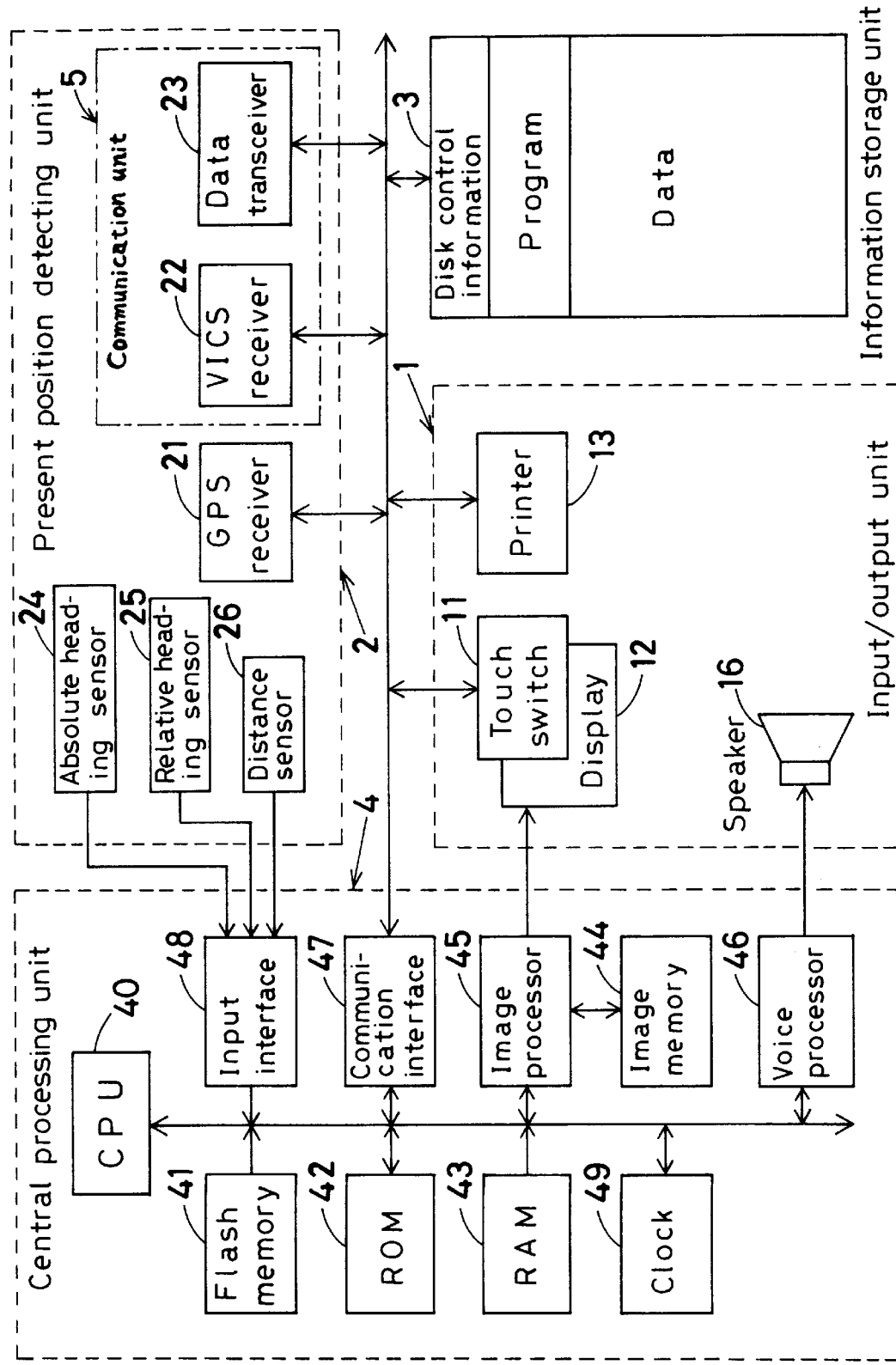
FIG. 1 is a block diagram of an embodiment of a vehicular navigation system according to the present invention.

As shown in FIG. 1, the vehicular navigation system of the present invention includes an input/output unit 1 for inputting and outputting information relating to route guidance, a present position detecting unit 2 for detecting or receiving information relating to the present position of the vehicle, an information storage unit 3 for storing navigation data necessary for calculation of a route and screen/voice guidance data necessary for route guidance and programs (OS and/or application), and a central processing unit 4 for performing route search processing and display/voice guidance processing necessary for route guidance and for controlling the overall system.

The input/output unit 1 instructs the central processing unit 4 to perform navigation processing, in accordance with the intention of the driver, e.g. responsive to input of the destination, and to output guidance information by voice output and/or screen display, as the driver needs such information. The unit is also provided with a printing function for printing out the data after processing. As the means to provide the foregoing functions, the input unit comprises a touch switch 11 or an operation switch for inputting the destination by telephone number, coordinates on a map, etc. and for requesting route guidance. A remote controller may be used as the input unit. The output unit comprises a display unit for displaying inputted data on screen and for automatically displaying route guidance on the screen at the request of the driver, a printer 13 for printing out the data processed by the central processing unit 4 or the data stored in the information storage unit 3, and a speaker 16 for outputting route guidance by voice.

It is possible to add a voice recognizer for voice input or a card reader for reading data recorded on an IC card or magnetic card. Also, it is possible to add a data communication unit for sending and receiving data to and from a remote information center where the data necessary for navigation is stored and is made available at the request of the driver via a communication line, or to and from an information source such as a personal computer wherein data specific to the driver and trip, such as map data and/or destination data, is stored in advance.

The display 12 comprises a color CRT or a color liquid crystal display unit and outputs all screens, in color display, necessary for navigation such as a route setting screen, a sector view screen, an intersection view screen, etc., based on map data and guidance data processed by the central processing unit 4. Also, buttons are displayed for the setting of route guidance, for giving information during route guidance and for switch-over between screens. In particular, transit intersection information such as intersection name is displayed, in pop-up color display, on the sector view screen as necessary.

The display 12 is installed on or in the instrument panel near the driver's seat. By watching the display map, the driver can confirm the present position of the vehicle and obtain information on the route ahead. The display 12 also comprises a touch switch 11 to match the display of function buttons. By touching one of the buttons, one of the above operations can be executed according to the inputted signal. Input signal generating means comprising the buttons and the touch switches constitutes the input unit.

The present position detecting unit 2 detects or receives information relating to the present position of the vehicle, and it comprises an absolute heading sensor 24 (geomagnetic sensor), a relative heading sensor 25 (steering sensor, gyro, etc.), a distance sensor 26 for detecting distance traveled from the number of revolutions of a wheel, a GPS receiver 21 utilizing the global positioning system (GPS), and a communication unit 5. The communication unit 5 comprises a VICS (Vehicle Information & Communication System) receiver 22, serving as traffic information acquiring means in the present invention, or a data transceiver 23. The VICS receiver 22 receives road traffic information by means of FM multiplex, radio beacon, or optical beacon. The data transceiver 23 is, for example, a portable telephone or a personal computer, which sends and receives the information necessary for navigation to and from a traffic information center (e.g. ATIS) at the request of the driver. By installing an image recognizer (e.g. video camera), instead of the communication unit 5, lane information can be obtained from the image recognizer. Further, the image recognizer may be used in combination with the communication unit 5.

The information storage unit 3 is an external storage unit wherein navigation programs and data are stored in an external storage medium such as CD-ROM (hereinafter simply referred as "CD"), optical CD, IC card, etc. The information storage unit is internally divided into a map drawing unit, a route searching unit, a route guiding unit, a present position calculating unit, a destination setting control unit, etc., and it consists of application programs and OS programs for signal processing associated with navigation. The stored programs and data include: a program for executing routines such as route searching, a program for display output control necessary for route guidance and voice output control necessary for voice guidance and the data necessary for operating these programs, and display information data necessary for route guidance and map display. The stored data includes map data, (road map, housing data, data for structure configuration maps, etc.), intersection data, node data, road data, photograph data, registered point data, destination point data, guidance road data, detailed destination data, destination pronunciation data, telephone number data, address data, and other data files. All data necessary for proper operation of a navigation system are stored.

The aforementioned programs may be stored in ROM in the central processing unit. More specifically, the stored programs include: a program for setting a destination or a transit point based on position information from the present position detecting unit 2 or on input signals from the input unit 11 and for executing route searching using the road data, a program for changing the road data searched in accordance with traffic information acquired from the communication unit 5 and for executing a new route search, a program for map drawing or map matching and programs for determining voice output timing along the travelled route and the content of voice phrase output. By starting the programs stored in the information storage unit 3, each of the navigation functions of the present invention is executed. Thus, the programs providing the functions of the present invention are stored in the information storage unit 3, i.e. an external storage medium, in the present embodiment.

The central processing unit 4 includes a CPU 40 for executing various computations and a flash memory 41 for reading programs from the CD of the information unit 3 and for storing the programs so read. The flash memory 41 erases the existing programs it stores when the programs on CD have been changed, making it rewritable. The central processing unit 4 also includes a ROM 42 where programs for performing program check of the flash memory 41 and for updating (program reading means) are stored, a RAM 43 for temporarily storing the searched route guidance information such as coordinates of the preset destination, road node No., etc. or the data under computation, an image memory 44 for storing image data to be used in screen display by the display unit, an image processor 45 and a voice processor 46. The image processor 45 picks up image data from the image memory 44, based on a display control signal from CPU 40, and provides an output to the display 12 after image processing. Voice processor 46 synthesizes voice, as phrases, comprehensive sentences, sounds, etc., read from the information storage unit 3, based on the voice output control signals from the CPU 40 and outputs the synthesized voice to the speaker 16 by conversion to analog signals. The central processing unit 4 also includes a communication interface 47 for giving and receiving input/output data via the communication unit 5, a sensor input interface 48 for receiving sensor signals from the present position detecting unit 2, and a clock 49 for entering date and time into the internal dialog information.

When the data acquired through the sensors of the present position detecting unit 2 is received via the sensor input interface 48 at the central processing unit 4, CPU 40 calculates the present position coordinates at a given time interval, based on the received data (sensor input), and writes the data temporarily into RAM 42. Map match processing is performed with the present position coordinates by taking detection error for each sensor into consideration. The output value of each of the sensors is compensated at all times. The system is designed so that the driver can select whether route guidance information is output on screen or by voice.

Figures 2A, 2B:
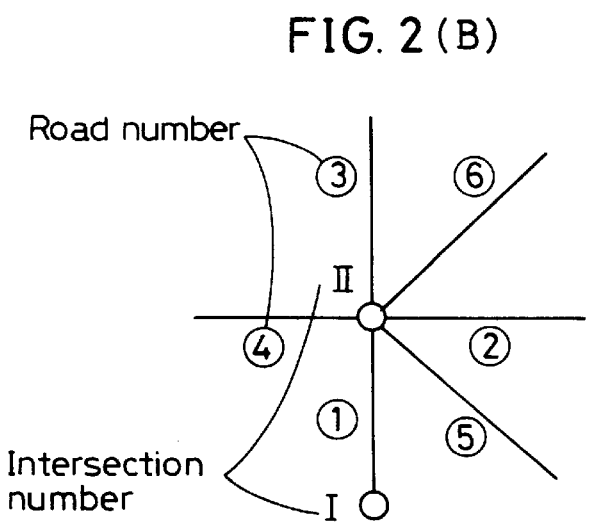
FIG. 2(A) shows a file of road data of the type used for route searching in the present invention and FIG. 2(B) illustrates identification of roads at an intersection, which identification determines the data file structure of FIG. 2(A)
Figures 3, 4:
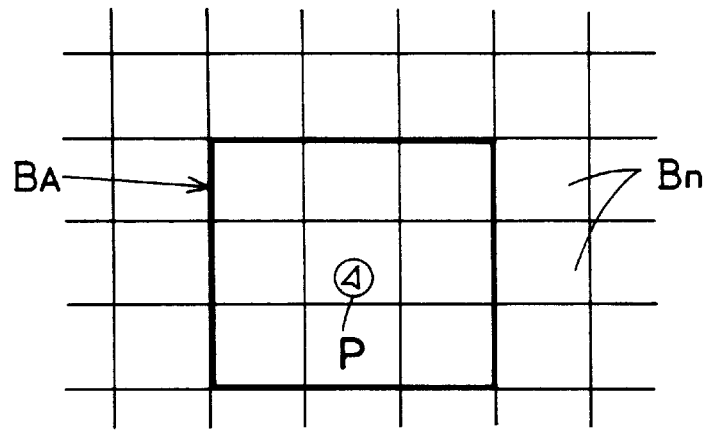
FIG. 3 is a drawing illustrating control of road data.
FIG. 4 represents an intersection data file for use in the present invention.

FIG. 2(A) shows the structure of the road data file containing the data necessary for determination of a route by the route searching unit and for providing route guidance. In the present invention, as shown in FIG. 3, the road data is divided into a plurality of blocks Bn, each being 3 to 10 km long, and, for the block including the present position P, as well as each block adjacent to that block, i.e. the area BA in the block 9, road data is acquired and this acquired data is used as a search data. In each of "n" (number) block numbers, there are "m" (number) road numbers. Associated with each road number, are data such as coordinates of starting point and end point; roads having the same starting point, roads having the same end point, length, road attribute, width, road requiring no guidance, access information such as no entry, one-way, etc., address and size of node data, etc. The road number is set for each road segment between intersections, both outward bound and return. The road attribute data indicate that the road is a national road or a prefectural road, that the road has an overpass or underpass, or indicates width or number of lanes. The node data are coordinate data of eastern longitude and northern latitude for each node, with each road being divided into a plurality of nodes.

In the data structure of FIG. 2 the information relating to intersections is stored as part of the road data; however, the intersection data may be provided separately from the road data as shown in FIG. 4. Information such as presence or absence of traffic signals and information on the connecting roads may also be stored separately; however, it is preferred that the connecting information be included in the road data because in this fashion it is easier to provide data indicating that it is impossible to enter from a certain road onto another road, and because such an arrangement decreases the amount of data required in storage.

FIG. 5 shows an example of guidance phrase data. Guidance statements are divided into phrases such as distance phrases, direction phrases, distinctive object phrases, etc. When guidance voice data is to be output, these phrases are combined together, and a phrase such as "Turn right about 300 meters ahead" or "Turn left at the next traffic signal" is prepared, and this is output at a preset guidance point.

Figures 6, 7A, 7B:
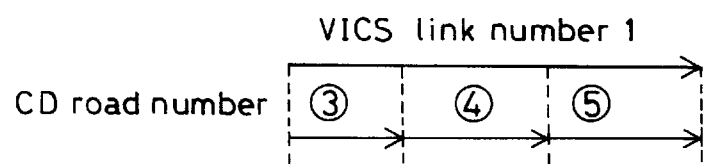
FIG. 6 shows a VICS transmission data file as used in the present invention.
FIGS. 7(A) and 7(B) illustrate correlation between road data stored in an information storage unit, and VICS transmission data in the present invention.

FIG. 6 represents transmission data to be transmitted from VICS. VICS transmits road traffic information in real time by FM multiplex, radio beacon, or optical beacon to vehicles. FM multiplex is used to transmit general information to a wide area, while a radio beacon or optical beacon is used to transmit more detailed information to a narrower area of about 10 km in radius around the position where the beacon is installed. When the vehicle passes through the transmission area of the beacon, information is received. For each link (road segment) number assigned to each road, the VICS transmission data will include data such as data for degree of congestion (e.g. closed to traffic, traffic jam, congestion, heavy traffic, normal traffic, etc.), location where the congestion starts, length of congested section, traffic restriction information (road construction information, no thoroughfare, etc.), traveling time (time required at a predetermined speed), lane information (number of lanes, information such as right turn lane, straight ahead lane, left turn lane, or the position of the lane relative to the left most lane). Further, traffic information may be acquired by gaining access to a traffic information center (e.g. ATIS) using a data transceiver (such as portable telephone set). In so doing, it is possible to acquire traffic information as the user needs it, and the optimal route based on traffic information can be requested.

Incidentally, the road data of FIG. 2 stored in a CD of the information storage unit 3 may not correspond 1:1 to the link number of VICS shown in FIG. 6 in some cases, and, if not, must be matched. FIG. 7(A) represents a table showing the link numbers of the road data stored in CD correlated with the link numbers transmitted from VICS, and FIG. 7(B) illustrates that correlation. Specifically, as shown in FIG. 7(B), the road of VICS link number 1 correlates with CD addresses 3, 4 and 5 to correspond to the road segment numbers 3, 4 and 5 in the CD-ROM. The method of correlation is not limited to this, and the link number transmitted from VICS may be correlated with the road data stored in CD in advance. In this case, an address to store the data relating to traffic congestion information from the VICS may be provided in the road data shown in FIG. 2(A), and the data obtained from VICS may be stored and used as the searched road data.

Figure 8:
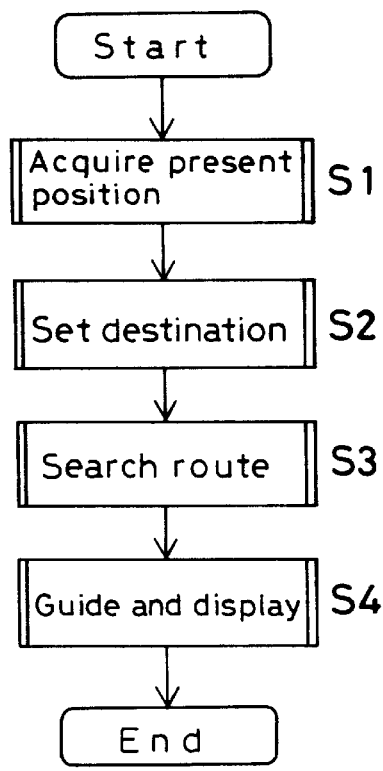
FIG. 8 is a flow chart of a main routine for operation of the overall navigation system of the present invention.
Figure 9:
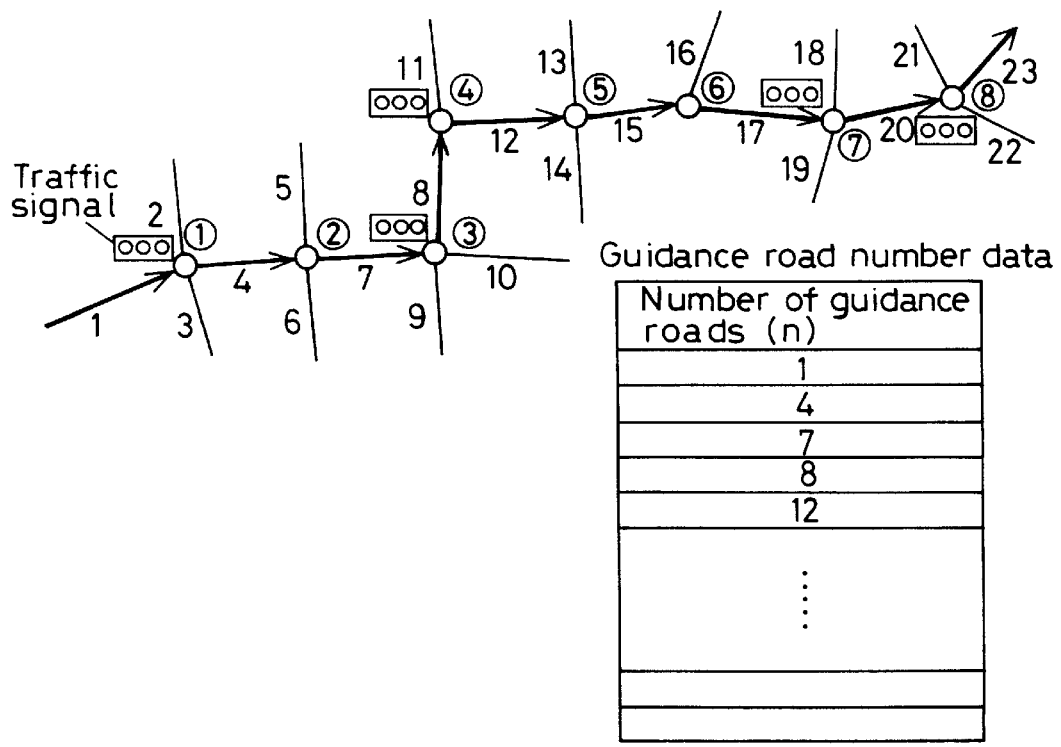
FIGS. 9(A) and 9(B) illustrate guidance road number data obtained by route searching in accordance with the routine of FIG. 8.

FIG. 8 is a flow chart of the program for operation of the overall navigation system of the present invention. When the navigation program is started by the CPU 40 of the central processing unit 4, the present position of the vehicle is detected by the present position detecting unit 2, a map of the vicinity around the present position is displayed, and name and other data of the present position are displayed (Step S1). Next, the destination is set by input of a telephone number, address, facility name, registered point name, etc. (Step S2), and a route from the present position to the destination is searched (Step S3). The route leading to the destination is set as guidance road number data by aligning road numbers for guidance as shown in FIG. 9. After the route is determined, route guidance and display are provided until the destination is reached, while tracing the present position through the present position detecting unit 2 (Step S4).

Figure 10:
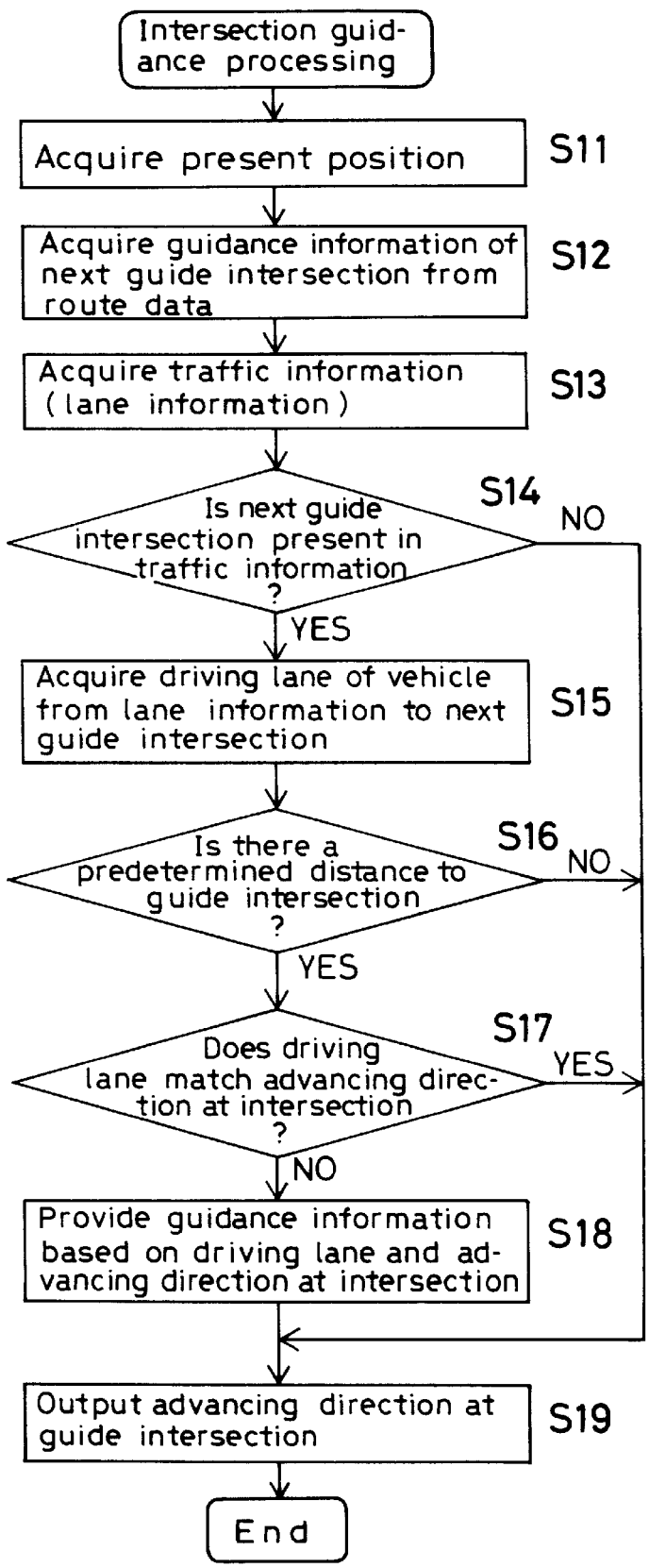
FIG. 10 is a flow chart of a subroutine for processing of intersection guidance information in an embodiment of the present invention.

The detected present position determines guidance processing at an intersection in the guidance and display processing of Step S4 as described above. FIG. 10 is a flow chart of a subroutine for providing intersection guidance in an embodiment of the present invention. First, the present position of the vehicle is acquired (S11), and guidance information for the next intersection where guidance is to be provided ("guide intersection") is next acquired from the route data (S12), and the distance from the present position to the guide intersection is calculated. Next, traffic information (including lane information) is acquired from the VICS in Step S13. This traffic information should be acquired at a given time or distance interval in advance of the branch point or the intersection, or the traffic information may be acquired after the setting of the destination in Step S2 of FIG. 8. Then, it is judged whether the next intersection is in the traffic information thus acquired (Step S14). If the next intersection is not in the acquired traffic information, the routine advances to Step S18, and normal guidance information such as "Turn right at the next intersection" or "Drive straight ahead at the next intersection" is provided by voice or on screen.

If the next guide intersection is found to be within the acquired traffic information (Step S14), the driving lane for proper approach of the vehicle to the next guide intersection is acquired from the lane information in Step S15. The driving lane of the vehicle is determined from VICS information based on the location of the source of the beacon. For example, information can be acquired such as left turn lane, straight ahead lane, right turn lane, or the number of lanes from the left most lane. Next, it is judged in Step S16 whether or not the vehicle is at a point a given distance from the guide intersection. This judgement in step S16 allows a determination of whether or not it is possible to change lanes before the vehicle reaches the guide intersection. If the vehicle is not yet within a predetermined distance from the guide intersection, the routine advances to Step S19, and guidance for direction of advance at the guide intersection is output.

If the vehicle is determined to be within the predetermined distance from the guide intersection in Step S16, it is judged whether or not the driving lane matches (is proper for) the direction of advance to be taken at the intersection (Step S17). For example, in the case where the driving lane of the vehicle is a left turn lane and the direction to be taken requires a left turn, the routine advances to Step S19, and guidance for the direction of advance at the guide intersection is output. In the case where the driving lane of the vehicle does not match the direction of advance at the intersection, guidance information is output in Step S18 based on the driving lane and the direction of advance at the intersection. For example, if there are three driving lanes and if guidance at the guide intersection is "left turn" and the driving lane of the vehicle is a straight ahead lane or a right turn lane, guidance information is output such as "Change one lane to the left." If the guidance at the guide intersection is "straight ahead" and the driving lane of the vehicle is a left turn lane or a right turn lane, guidance information is output such as "Change to the center lane." If there are two or more left turn lanes or right turn lanes, guidance information such as "Change to the (n-th) lane from left" should be output.

Figure 11:
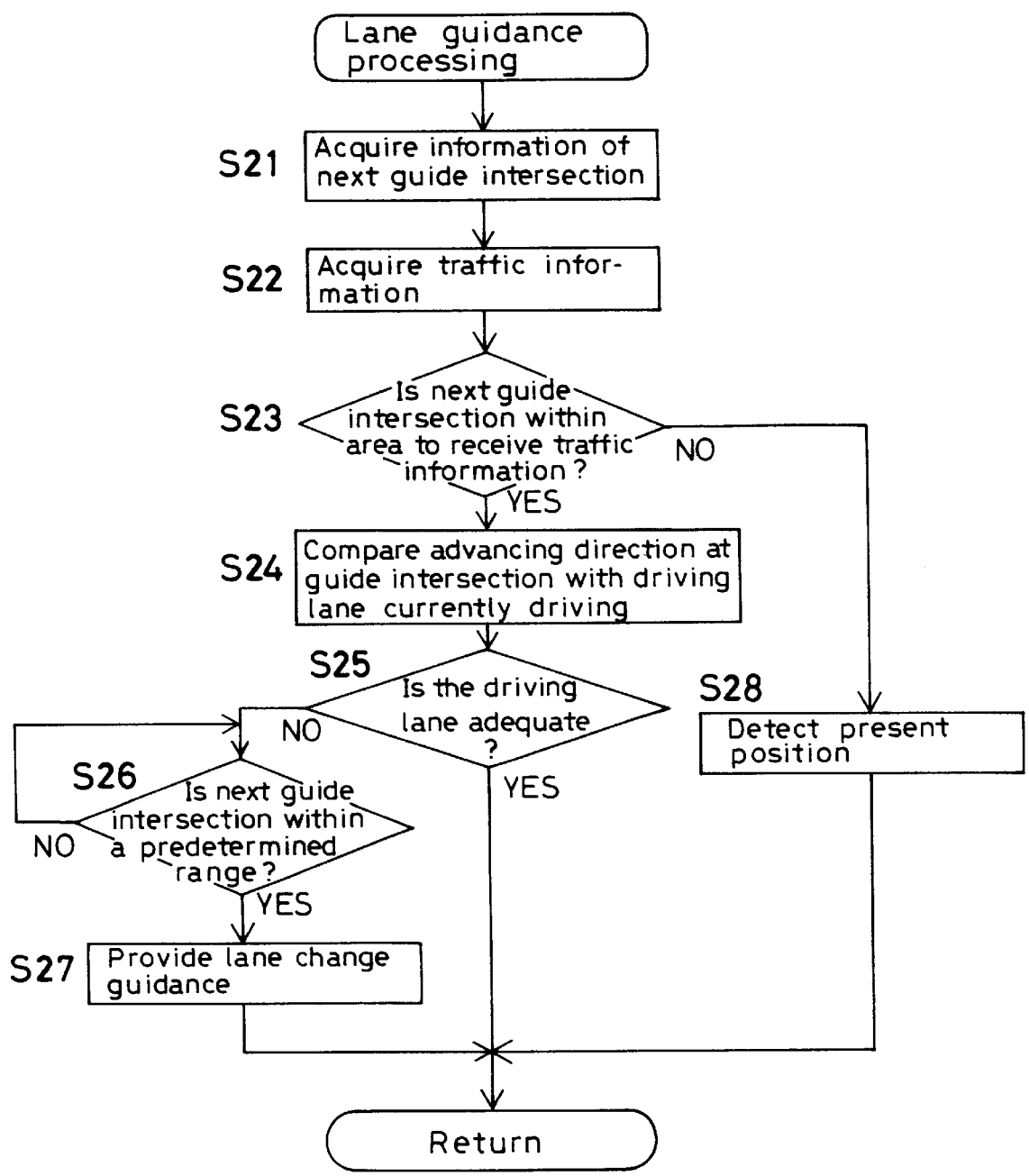
FIG. 11 is a flow chart of a subroutine for processing to output lane change guidance in another embodiment of the present invention.

FIG. 11 is a flow chart of a subroutine for lane change guidance in accordance with another embodiment of the present invention. First, from the route information acquired in advance, the information for the next guide intersection is read and confirmed (Step S21), and traffic information (such as VICS information) is acquired (Step S22). Then, it is judged whether or not the next guide intersection is included in an area to receive the traffic information (Step S23). In case it is not included, the present position is detected (Step S28) and the routine is once completed because there is some distance remaining to the next guide intersection.

If it is judged in step S23 that the vehicle is within the area receiving traffic information, the direction of advance at the guide intersection confirmed in Step S21 is compared with the lane information for the current driving lane as acquired in Step S22 (Step S24). Next, it is judged whether or not the current driving lane is proper (Step S25). If the current driving lane is proper, e.g. if guidance at the guide intersection is "left turn" and the vehicle is currently driven in a left turn lane, it is judged that there is no need to change lanes, and the processing is once completed.

On the other hand, if it is judged in Step S25 that the driving lane is not proper, it is judged (Step S26) whether or not the distance from the present position to the guide intersection is close to the predetermined value. This processing is repeated until the distance to the guide intersection becomes close to the predetermined distance. When it is judged that the distance to the guide intersection is close to the predetermined distance, information as to how to change lanes is given in voice or display (Step S27).

The present invention is not limited to the above-described embodiments, and various changes and modifications can be made. For example, the driving lane is detected by utilizing traffic information (VICS information) in the subroutines of FIG. 10 and FIG. 11, while information on number of lanes ("road attribute" in FIG. 2(A)) may be read from the information storage means 3 and the driving lane may be detected based on the output from the present position detecting means 3. Alternatively, the current driving lane may be detected from image by utilizing a video camera. For example, if the vehicle should be turned left at the guide intersection, the driver may be notified that the vehicle should be driven in the left turn lane. Further, Step S25 may be omitted, until the vehicle comes close to the guide intersection. On a road having two or more lanes, there may be two or more left turn lanes or right turn lanes in some cases. In such a case, lane information may be obtained from VICS information via the communication unit S or lane information may be read from the information storage unit 3 where it is stored in advance, and the lane guidance information of Step S27 may be output as simple lane guidance information such as "Two lanes on left side are for left turn" or "Right turn lanes are the two lanes on right side".

In another embodiment of the present invention, when traffic information has been acquired but there is still some considerable distance remaining to the next guide intersection, it is anticipated that a lane change may be made from the current driving lane before the guide intersection is reached. Accordingly, it may not be adequate to provide guidance based on the acquired traffic information. In this respect, when lane information is acquired at a point relatively far from the guide intersection, lane change from the current driving lane is monitored. For example, using detecting means such as steering sensor, gyro sensor, video camera, etc., a lane change is detected. By combining the received traffic information (e.g. VICS information) with input from the detecting means on the vehicle, it is possible to provide guidance for a lane change even when traffic information cannot be received near the guide intersection.

Further, the system may be designed in such manner that the output of the lane guidance is controlled in response to vehicle speed. In this case, the timing of lane guidance processing can be controlled by setting a predetermined vehicle speed. For example, in case the vehicle is driven at a speed of 60 km/h, the system would not process information within 700 m of the guide intersection. When it is judged that the vehicle speed is not more than 30 km/h, the traffic information received within 300 m of the guide intersection is not processed. By controlling the timing of output of lane guidance based on the vehicle speed, it is possible to prevent the output of guidance immediately in advance of the guide intersection, so that the driver can drive at ease and without anxiety. In case traffic is congested, it is possible to process the guidance information at a point closer to the guide intersection, and more accurate guidance information can be output.

In another embodiment, the invention is applied to an automatic driving system which controls driving speed of the vehicle and/or steering angle. In this embodiment, the present position information detected by the present position detecting means is compared with guidance information for the next guide intersection, and the information relating to the lane change is output to the central processing unit. For example, in Step S17 of FIG. 10, it is judged whether or not the driving lane matches the direction of advance at the next guide intersection. If these do not match, information relating to lane change is output. By controlling the driving speed of the vehicle and/or steering angle according to this information, it is possible to perform automatic driving.

Next, variations of the present invention will be described with reference to FIG. 12 to FIG. 18.

The information storage unit as described above contains data files such as indices, map data, search data, guidance data, map matching data, destination data, etc., and serves as a data base wherein all data necessary for a navigation system are recorded, utilizing CD-ROM in many cases as a storage medium. The CD-ROM is available on the market as a single unit. When the user wants to use a CD-ROM provided with the latest map data, the user should purchase a new CD-ROM and replace the old one. In this way, road map data in the past has been updated by replacing a CD-ROM with a new one. However, when a new road is opened after the new CD-ROM has been installed, it is not possible to acquire display or guidance for that new road. Accordingly, another object of the present invention is to provide a vehicular navigation system, by which it is possible to avoid the need for replacement of a CD-ROM normally occasioned by the opening of a new road and to provide for acquisition of display or guidance information for the more recently opened road.

Figure 12A:
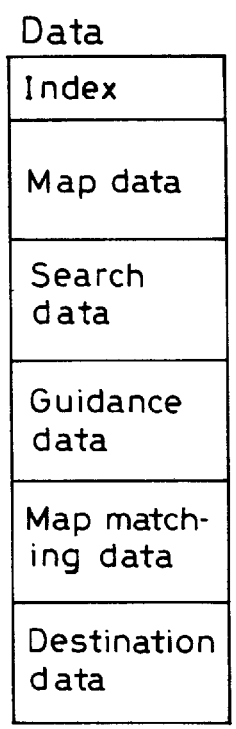
FIG. 12(B) shows structure of a program for the navigation system of the invention and FIG. 12(A) shows structure of the data utilized therein.
Figure 12B:
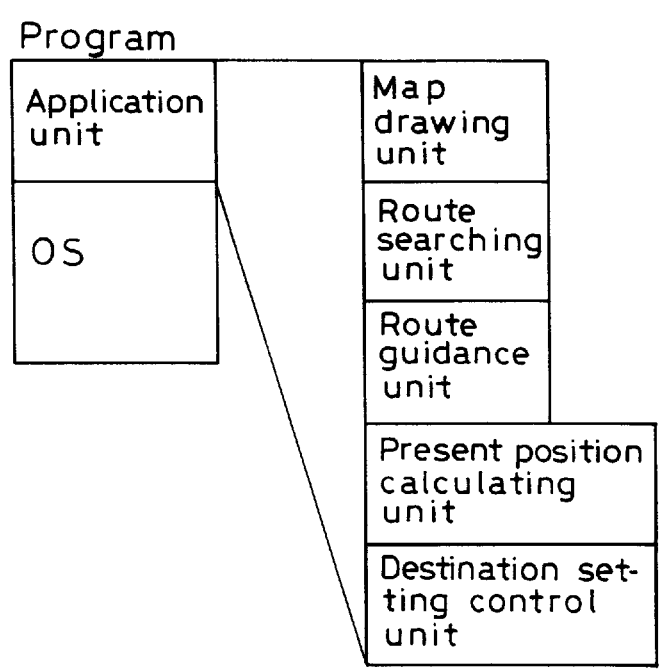

As shown in FIG. 12, the internal arrangement of the information storage unit 3, includes a map drawing unit, route searching unit, route guiding unit, present position calculating unit, destination setting control unit, etc., wherein both application programs and OS programs are stored for signal output processing for navigation. More specifically, the following programs and data are stored therein: a program for executing route searching, programs for the various routines shown in flow charts of the drawings here, a program for display output control necessary for route guidance and voice output control necessary for voice guidance and the data necessary for operating these programs, and further display information data necessary for route guidance and map display (FIG. 12(b)). More specifically, the stored data includes files of map data, search data, guidance data, map matching data, destination data, etc., and all data necessary for operating the navigation system (FIG. 12(a)). It is also applicable to provide for storage of the data only in CD-ROM, with the programs being stored in the central processing unit.

FIG. 13 shows major map data files stored in the information storage unit 3 of FIG. 1.

FIG. 13(a) represents guidance road data files where the data necessary for determining a route by route search means and for providing route guidance are stored. For each of "n" (number) roads, the data include road number, length, road attribute, address and size of shape data, and address and size of guidance data. The road number is set for each direction (outward course and return course) for each road segment between branch points. The shape data comprises, as shown in FIG. 13 (b), coordinates of eastern longitude and northern latitude for nodes along each of several meters of road, with each road being divided to a plurality of nodes. The map drawing unit of the program shown in FIG. 12 draws a road based on the coordinate data for the nodes.

The guidance data include, as shown in FIG. 13(c), intersection (or branch point) name, precaution data, road name data, address and size of road name data, and address and size of destination data.

The road attribute data serving as auxiliary data for road guidance information comprises, as shown in FIG. 13 (d), information on the status of the road such as overpass, road alongside overpass, underpass, road alongside underpass and information on number of lanes. Also, information as to whether or not the road has been opened or the date of the scheduled opening in case of an unopened road are included. In this way, data for an unopened road may be stored in advance as road data and, when it is confirmed that the road has been opened, this data becomes included in the search data and map matching data. This feature represents another preferred embodiment of the present invention. When it is judged that the unopened road has been opened, a flag to indicate the open status in FIG. 13(d) is updated from "0" to "1". Thereafter, the application program checks the flag "1" and treats it as part of the route search data.

Instead of indicating the open status of a road by the setting of a flag, the road status may be indicated by the "cost" of the route, i.e. in the case of an unopened road, the "cost" is increased to such degree that it will not be selected by the route searched, and when the road is opened, the cost is equalized with that of the other roads.

Figure 14:
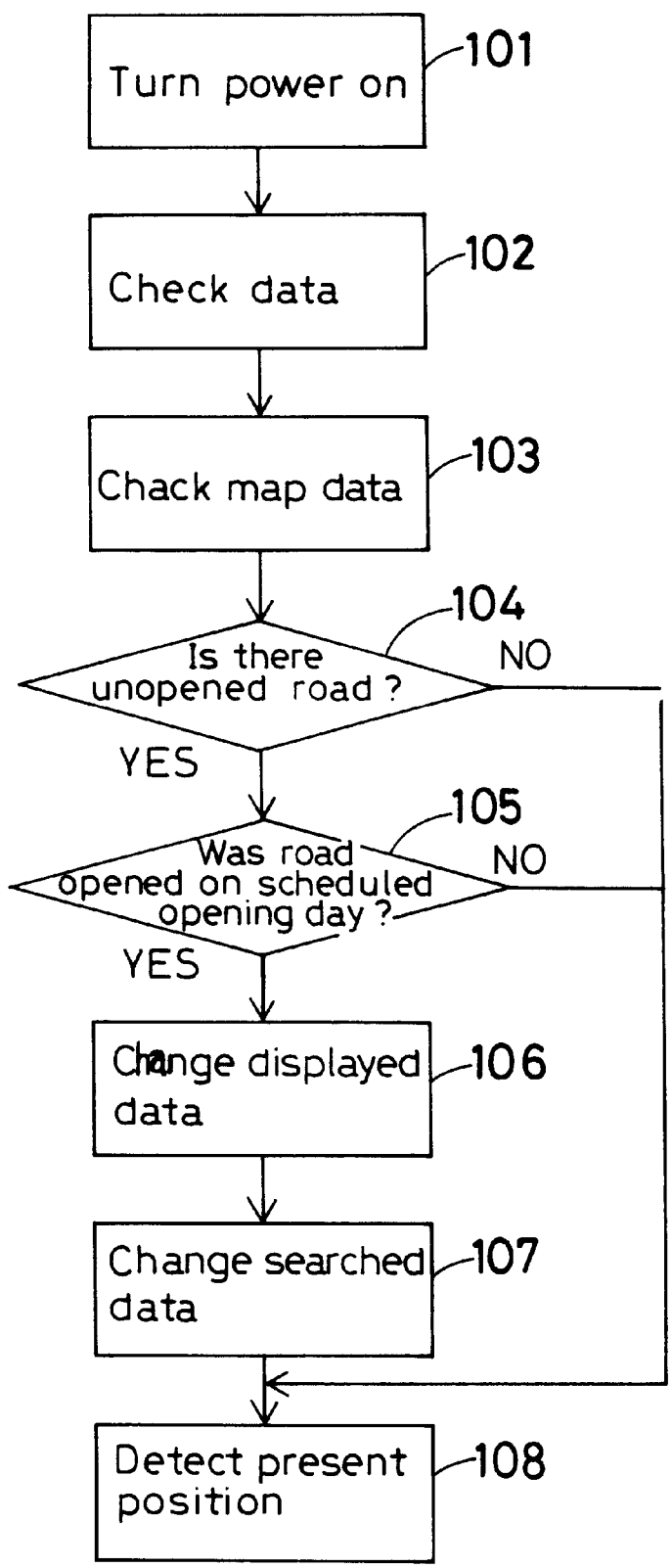
FIG. 14 is a flow chart of a routine for judging if a road has been opened based on the date of scheduled opening of the road.

FIG. 14 is a flow chart of a routine for judging that a road has been opened because the current date is on or after the date of the scheduled opening of the road. When the navigation system is turned on (Step 101), the date is confirmed by the clock incorporated in the central processing unit of FIG. 1 (Step 102). Next, the map data is confirmed (Step 103), and it is judged whether or not there is an unopened road in the map data (Step 104). This judgement is based on the existence of a flag, indicating unopen status, associated with the road attribute data of the guidance road data shown in FIG. 13, for example. If there is no unopened road, the present position is detected (Step 108), and route searching and guidance are performed according to the routine as shown in FIG. 8. In case there is an unopened road, the confirmed date as described above is compared with the date of the scheduled opening, and it is judged whether or not that date of the scheduled opening has arrived. Naturally, comparison may be made not only by day but also by hour. If it is not yet the date of opening, it is judged that the road is an unopened road, and route searching is performed based on the map data, exclusive of that for the "unopened" road in question. If it is already on or after the date of opening, it is judged that the road has been opened, and the flag indicating status is updated from "0" to "1". The depiction of the road in the display is changed from broken line to solid line, for example, or it is newly included in the display (Step 106 and 107). Next, the present position is detected (Step 108), and route searching is started.

As described above, data for the unopened road is included in the search data on the condition that it is already on or after the date of the scheduled opening, and it is possible to provide display and guidance including the most recently opened road. In the present embodiment of the invention, it is checked whether an unopened road is present or not when the navigation program is started, which check may be limited only to that map data which is required at the time of route searching.

Figure 15:
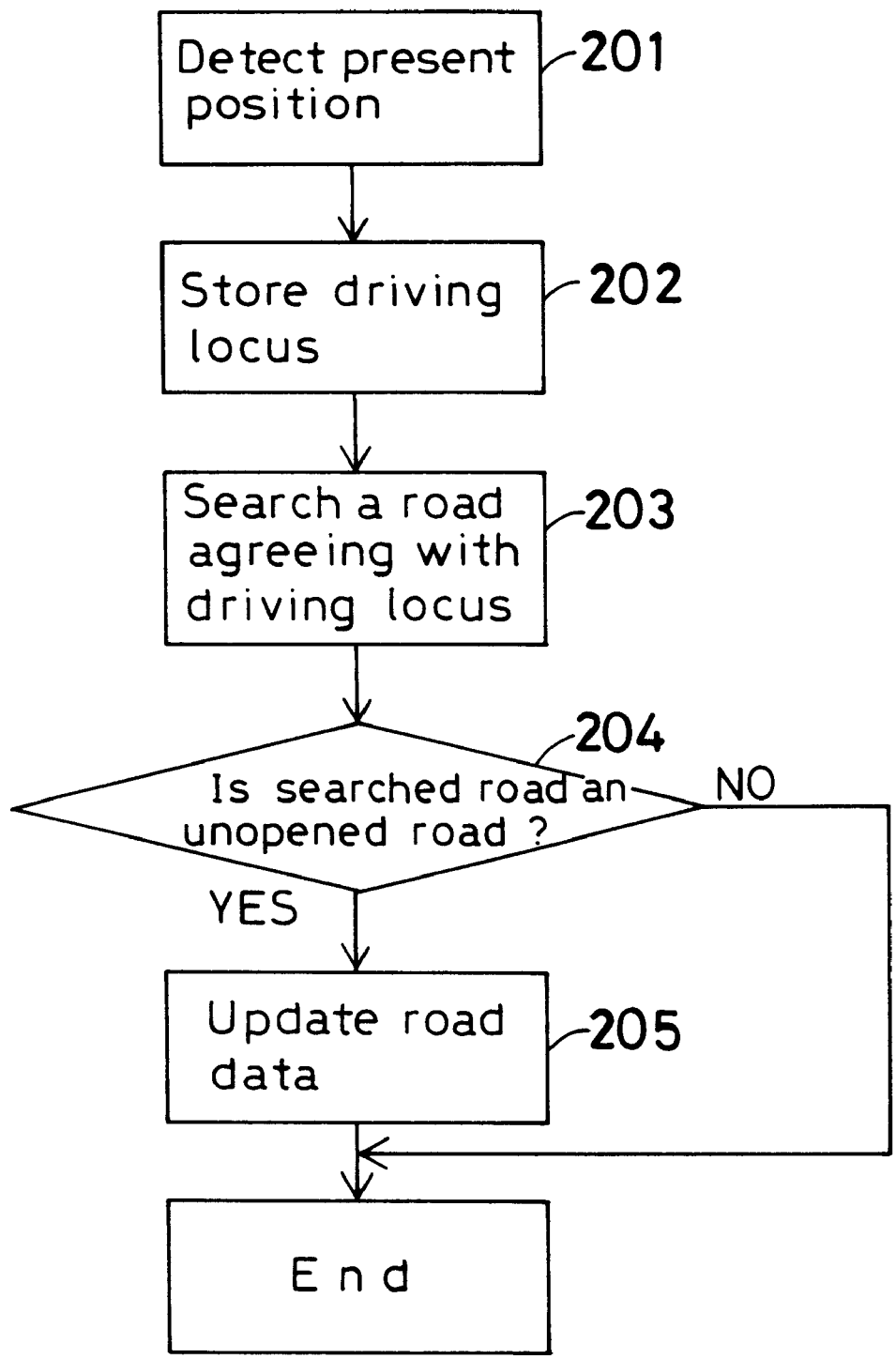
FIG. 15 is a flow chart of a routine for judging "open" status of a road based on actual driving experience.

FIG. 15 is a flow chart of a routine for judging opening of a road based on actual driving experience. The present position is repeatedly detected by the present position detecting unit (Step 201), and these detected positions are traced on the map by the present position calculating unit of the application program of FIG. 12 based on the above data. These detected positions are connected with one another, and a driving locus is generated and stored (Step 202). Next, the driving locus is compared with map matching data, and a road is searched where these parameters are equal to each other (Step 203). When a road is searched where map matching data agrees with the driving locus, it is judged whether or not this searched road is flagged as unopened (Step 204). If flagged as an unopened road, (flag) status in the road attribute data of FIG. 13 is updated from "0" to "1" (Step 205). On the other hand, if the searched road is flagged as an opened road, the judgment routine for that road is ended.

Figure 16:
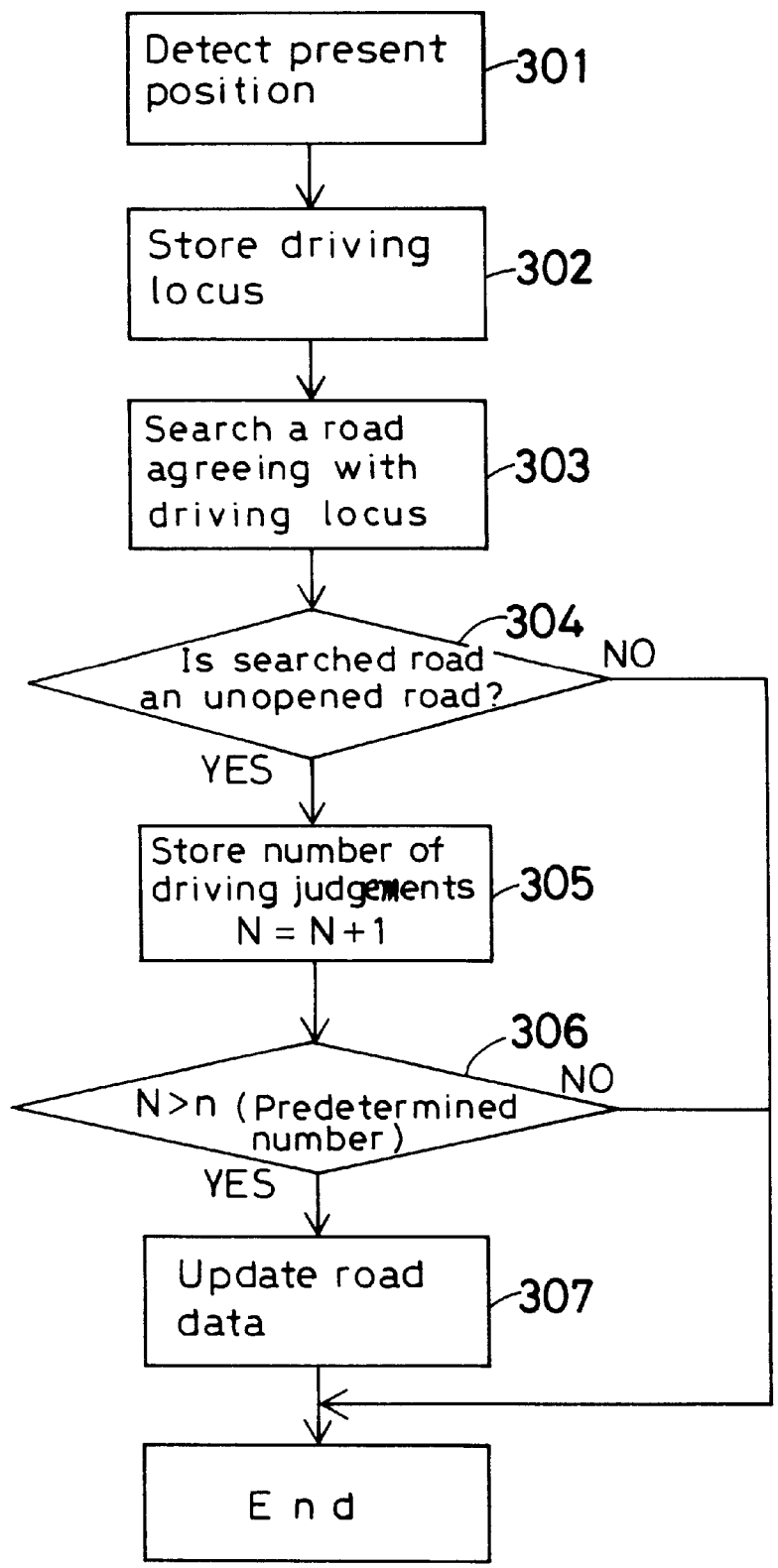
FIG. 16 is a flow chart of a routine for judging "open" status of a road based on a given number of driving experiences.

In the opening judgment routine of FIG. 15, "open", status is established for a road which agrees with the driving locus on one occasion, but there is the possibility of error if based on a single driving experience. The judgment routine shown in FIG. 16 is designed to eliminate such a possibility. More specifically, FIG. 16 is a flow chart of a routine which judges open status based on a predetermined number of driving experiences. The present position is repeatedly detected by the present position detecting unit (Step 301), and the present position on the map is repeatedly calculated by the present position calculating unit of the application program in FIG. 12 based on the above data. By connecting these detected "present" positions with one another, a driving locus is generated and stored (Step 302). Next, the driving locus is compared with map matching data, and a road is searched where these parameters agree with each other (Step 303). When the searched road of the driving locus is located in the map matching data, it is determined whether or not the searched road is flagged as "unopened" (Step 304). If the road is flagged as "unopened", the number "N" of driving experiences is increased by one (Step 305), and it is judged whether or not the number "N" of the driving experiences is larger than a predetermined number "n" (Step 306). If the number "N" of driving judgments is larger than the predetermined number "n", it is judged that the road has been opened, and the flag indicating opening status in the road attribute data of FIG. 13 is updated from "0" to "1" (Step 307). If the road is judged to be an opened road in Step 304, and if the number "N" of driving judgments is smaller than the predetermined number "n" in Step 306, the routine for judging opening of the road is ended.

As described above, a road flagged "unopen" is judged "open" only after the driving locus agrees with (includes) the "unopened" road for a predetermined number of judgments, thus minimizing the possibility of an erroneous judgment.

Figure 17:
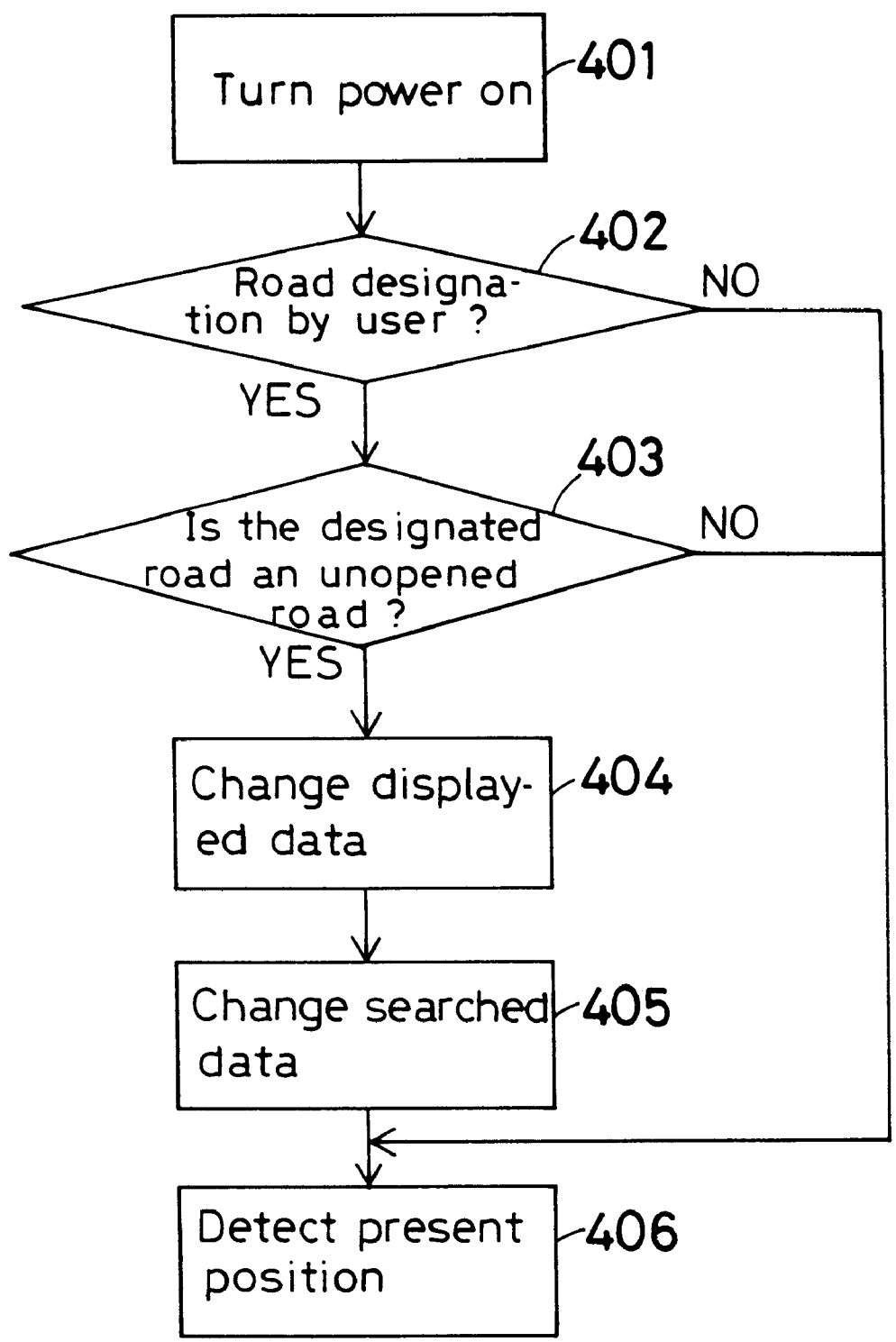
FIG. 17 is a flow chart of a routine for updating "open" status data for a road based responsive to input of a designation of open status by the user.

FIG. 17 is a flow chart of a routine for judging whether or not a road is opened based on road designation by the user. When the navigation system is turned on (Step 401), it is judged whether or not there has been a road designation by the user (Step 402). If there has been a road designation by the user and the designated road is currently flagged "unopened", it is judged that the road has now been opened and the flag is changed, as well as the display which is changed, for example, from a broken line to a solid line and the data for that designated road is included in the search data (Steps 404 and 405). The present position is then detected, and route searching is started. In case there is no road designation by the user, the present position is detected without further determination of "open" or "unopen" status, and route searching is started.

By this processing, it is possible to utilize designation by the user in case the date of the scheduled opening is advanced from the original schedule or the road has been opened before the date and time as originally set in the stored road data. Through designation by the user, the date of the scheduled opening of each road may be corrected. In this case, based on the corrected date and time of the opening, the processing as explained in connection with FIG. 14 is performed. For inputting a road designation as described above, an electronic device such as a notebook type device, telephone line, FM signal, VICS or other external input means may be used instead of manual input by the user.

Figure 18:
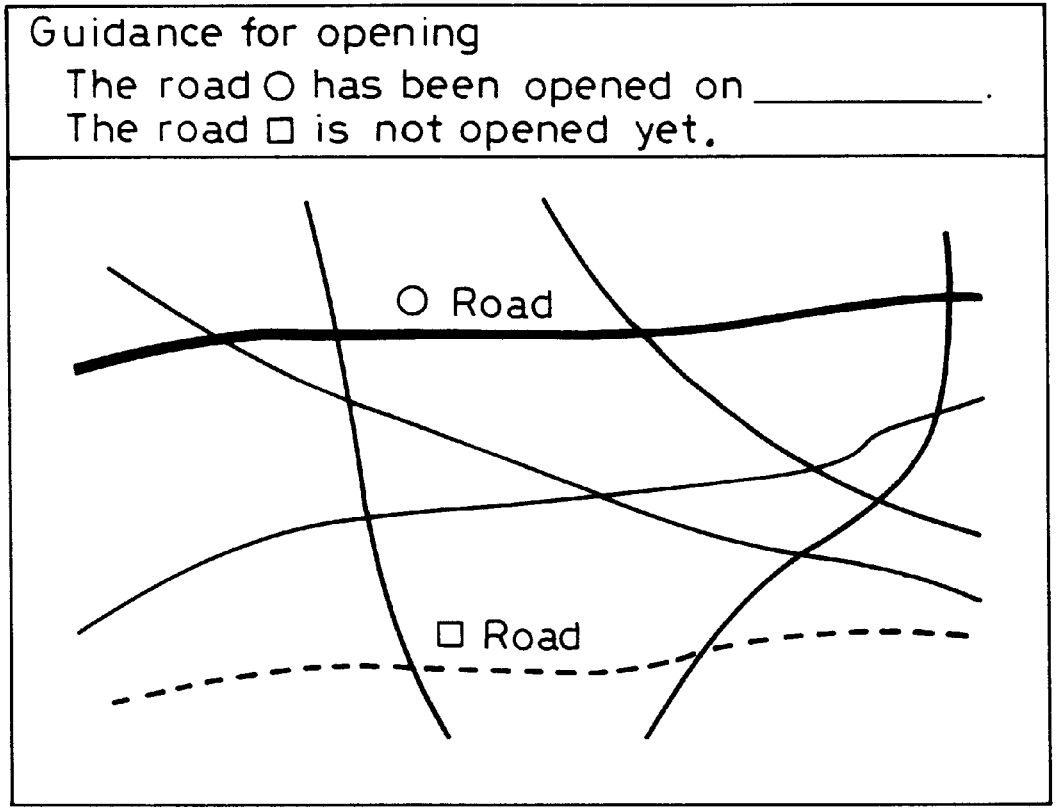
FIG. 18 illustrates an example of a display wherein open roads are displayed in a mode different from that of unopened roads and guidance information on the opening of a road is thereby provided.

In the latter described embodiments of the invention, the data for "unopened" road status is stored and converted to "open" road data subject to satisfaction of a given condition. For example, as shown in FIG. 18, a road opened sometime in the distant past and a road recently opened can be distinguished by different display modes, each distinct from that for an unopened road, by indication with different marks (e.g. a circle or a rectangle). When a road which has been an opened satisfies a given condition, it is judged that the road is now "opened." Accordingly, as shown in FIG. 18, for example, it is possible to provide information for opening of the road, and the opened road can be effectively utilized for navigation and travel. In the embodiments shown in FIG. 15 to FIG. 18, the change in status can be recognized without need for date and time of the scheduled opening as shown in the example of FIG. 14, and the amount of data stored in the information storage unit can thereby be minimized.

Thus, the data indicating "unopened" road status is stored in advance in the storage unit and opened roads are displayed in a different display mode from that used for unopened roads, and guidance can be provided for by display in a more easily understandable manner. When an "unopened" road satisfies a given condition, the data for that road is changed for inclusion in data for opened roads, and guidance can then be based thereon. Thus, because it is possible to provide guidance for a road of previous "unopened" status, the need for replacement of CD-ROMs can be minimized.

The setting of conditions for judgement of "open" status of a road provides the following advantages:

(1) In case the schedule of the opening of a road is already known, guidance can be provided based on data inclusive of hat for the road which is opened according to the schedule.

(2) In the case of a judgement based on actual experience in driving on the road in question, it is possible to provide updated guidance for the next trip even when the schedule for the opening of that road is not known.

(3) Because the "open" "unopen" status data are changed according to a predetermined number of driving judgments, error in the judgement of status occasioned by an error in the detected present position can be avoided.

(4) Further, even when the schedule of the opening is not known in advance, guidance inclusive of the previously "unopen" road can be provided as necessary by input of an "open" designation by the user.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system for a vehicle providing route guidance to an input destination, along a route set in advance, comprising:

present position detecting means for detecting the present position of the vehicle;

a memory containing stored road data inclusive of flagged data for unopened roads;

search means for searching said stored road data, exclusive of said flagged data, to set the route;

road status update means for determining if a road flagged unopened is currently open and for removing the flag from said flagged data if said road is determined to be currently open.

2. A navigation system according to claim 1 wherein said road status update means acquires data for a road section currently travelled and compares that acquired road section data with said flagged data and, if the acquired road section data matches said flagged data, removes the flag from said flagged data.

3. A navigation system according to claim 1 wherein said memory additionally contains stored therein information as to a scheduled date for opening of an unopened road and wherein said current status update means determines whether or not a current date is on or after the scheduled date and, if on or after, removes the flag from the data for the unopened road.

4. A navigation system for displaying a road map, comprising:

a memory for storing road data, for generating the display of the road map, inclusive of data for opened roads data and data for unopened roads; and control means for reading out the road data from the memory and for drawing the road map displaying opened roads and unopened roads, with the opened roads displayed in a different form than the display form of the unopened roads.

* * * * *